US008639561B2

(12) United States Patent
Boudreau et al.

(10) Patent No.: US 8,639,561 B2
(45) Date of Patent: Jan. 28, 2014

(54) DETERMINING AN OPTION FOR DECOMMISSIONING OR CONSOLIDATING SOFTWARE

(75) Inventors: Michael K. Boudreau, Orange, CA (US); Jamie B. Marsnik, Annandale, MN (US); Bradley T. Moore, Dana Point, CA (US); Clinton W. Wright, Lakewood, CO (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 13/222,349

(22) Filed: Aug. 31, 2011

(65) Prior Publication Data

US 2013/0054492 A1    Feb. 28, 2013

(51) Int. Cl.
*G06Q 10/00* (2012.01)
*G06Q 30/00* (2012.01)
*G06F 17/00* (2006.01)
*G06G 7/00* (2006.01)

(52) U.S. Cl.
USPC ............................ 705/7.35; 705/1.1; 705/400

(58) Field of Classification Search
USPC ......................... 705/1.1, 7.11–7.42, 400–412
See application file for complete search history.

(56) References Cited

U.S. PATENT DOCUMENTS

| 7,519,561 | B2 * | 4/2009 | Boomershine et al. | 705/400 |
| 7,797,678 | B2 | 9/2010 | Moulckers et al. | |
| 2003/0055749 | A1 | 3/2003 | Carmody et al. | |
| 2006/0111874 | A1 | 5/2006 | Curtis et al. | |
| 2009/0319782 | A1 * | 12/2009 | Lee | 713/156 |
| 2010/0250730 | A1 | 9/2010 | Menzies et al. | |
| 2010/0275212 | A1 * | 10/2010 | Saha et al. | 718/104 |

FOREIGN PATENT DOCUMENTS

WO    00/52559 A1    9/2000

* cited by examiner

*Primary Examiner* — George Chen
(74) *Attorney, Agent, or Firm* — Nicholas L. Cadmus; Abdul-Samad Adediran (57) ABSTRACT

Embodiments include a computer system, method and program product for managing a software program installed on a computer hardware system, the software program subject to a software license. A retrieval of data is performed in which the data indicates actual usage of the software program and the computer hardware system, and processor power of the computer hardware system. In addition, a retrieval of licensing data from the software license is performed in which the licensing data indicates a permitted number of or fee for installations of the software program and a permitted amount of or fee for processor power of the computer hardware system in which the software program is installed. Whether to decommission a copy of the software program based on the data indicating actual usage, the licensing data, a projected amount of future usage of the software program, and criticality of the software program is determined and reported.

16 Claims, 4 Drawing Sheets

DETERMINING AN OPTION FOR DECOMMISSIONING OR CONSOLIDATING SOFTWARE

TECHNICAL FIELD

The present invention relates generally to compliance with software licenses, and more particularly to a software license optimization program for determining an option for decommissioning a software program or consolidating the software program installed on a computer in a networked computing environment.

BACKGROUND

It was known to install and execute a variety of computer software programs, such as operating systems, applications and middleware on a computer or on a logical partition (LPAR) of a computer. An LPAR is a simulated division of computer resources, such as processor(s) and memory, of a real computer to create what appear to be separate computers for programs executing in each LPAR. For example, different subsets of the total processors of the real computer can be allocated to different LPARs, or different time slices of a single processor can be allocated to different LPARs. The software programs(s) on each LPAR utilize the real resources allocated to their LPAR.

Typically, software vendors license software programs to organizations, such as a business or government, and charge the organizations monthly or yearly software license fees. The instruments used to license the software programs are called software licenses, and the software licenses generally have restrictions on usage that include the number of copies of the software programs that may be installed, and the number of computers on which the software programs may be installed. Thus, the software license fees may be set based on the restrictions on usage that are in the software licenses. In addition, software vendors may impose penalties if an organization is non-compliant with the software licenses. Hence, a common challenge organizations encounter is how to comply with their software licenses.

In addition, it was known for an organization to decommission a software program or consolidate the software program, installed on a computer or a LPAR, onto a different computer or a different LPAR to stay in compliance with a software license and reduce software license fees. However, large organizations often lack an efficient way to generate reliable software and hardware usage data (i.e., data indicating actual usage) on all their enterprise software and legacy systems.

Moreover, an organization's non-compliance with their software licenses typically results in part from the organization not having access to data that indicates the number of software licenses they have purchased, persons or entities entitled to utilize the software programs pursuant to the licenses, and whether the persons or entities are utilizing the software licenses in a way that is in accord with software entitlements rules. Under many existing software licenses, the software license fees can be reduced by consolidating different copies of a software program on a single real computer or LPAR. But there may be factors that influence options for consolidating other than immediate cost as determined by a license fee calculation.

Current software reporting programs provide information on installed software programs and utilization of the installed software programs within a networked computing environment, and can even determine whether an organization is in compliance with terms and conditions of their software licenses. However, the current software reporting programs do not have an effective method for determining options for decommissioning or consolidating the software programs. Thus, the challenge of creating a software reporting program that determines options for decommissioning or consolidating a software programs, in order to reduce software license fees and satisfy other customer needs in the short and long term, continues to persist.

SUMMARY

The present invention resides in a computer system, method and program product for managing a software program installed on a computer hardware system, the software program subject to a software license. Data indicating actual usage of the software program and the computer hardware system, and data indicating processor power of the computer hardware system are retrieved. In addition, licensing data from the software license are retrieved indicating a permitted number of or fee for installations of the software program and a permitted amount of or fee for processor power of the computer hardware system in which the software program is installed. Whether to decommission or consolidate the software program is determined and reported based on the data indicating actual usage, the licensing data, a projected amount of future usage of the software program, and a criticality of the software program if the software program is listed as critical. In addition, whether to decommission a copy of the software program is determined and reported in order to satisfy current and future usage needs for the software program and (a) comply with the permitted number of installations of the software program and the permitted amount of processor power of the computer hardware system in which the software program is installed, or (b) reduce fees for the software license.

DETAILED DESCRIPTION

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

Figure 1:
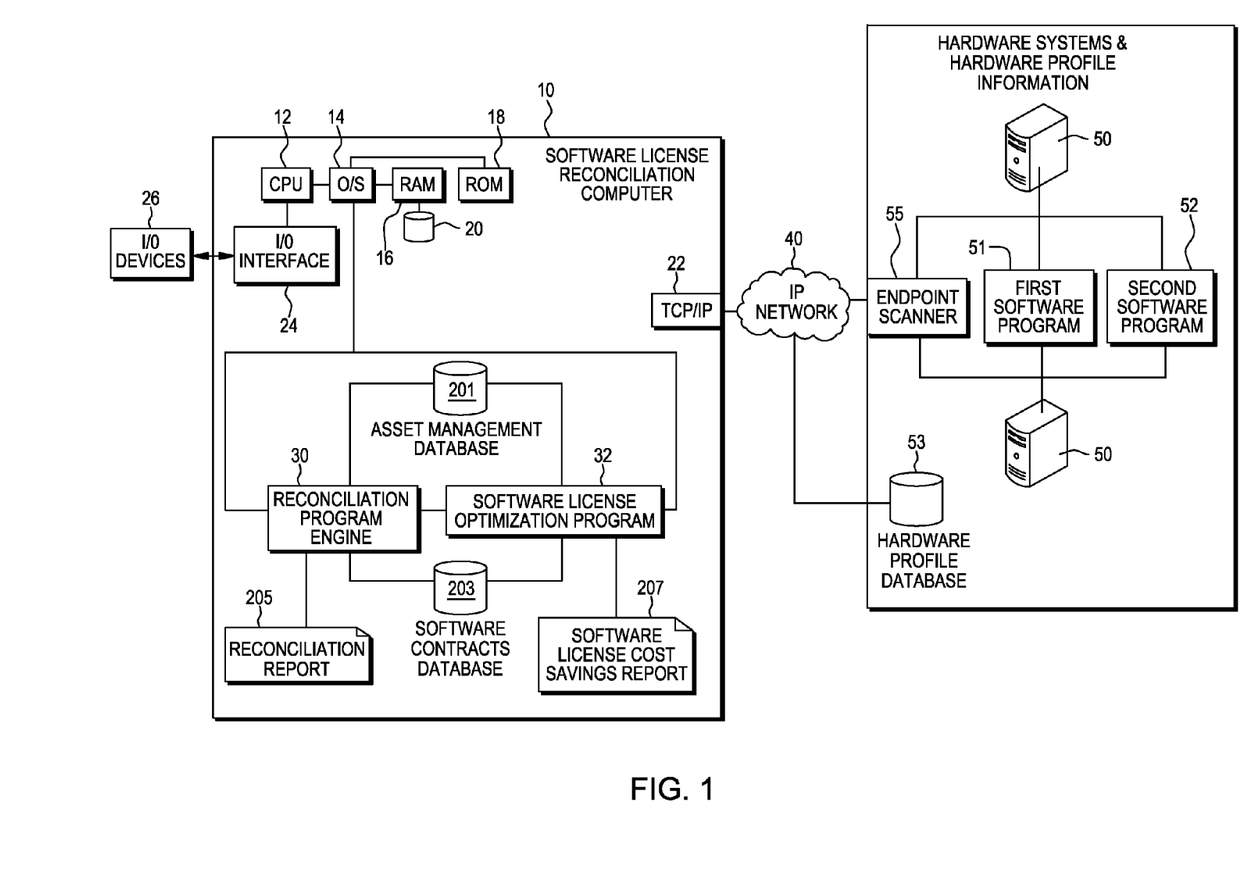
FIG. 1 is a block diagram of a computer system including a software license optimization program according to an embodiment of the present invention.

FIG. 1 illustrates a software license reconciliation computer 10 with CPU 12, operating system 14, RAM 16, ROM 18, storage 20 and TCP/IP adapter card 22. RAM 16, ROM 18, and storage 20 are examples of computer-readable storage devices. The term "computer-readable storage device" does not encompass signal propagation media such as a copper cable, optical fiber, or wireless transmission media. Computer 10 includes reconciliation program engine 30, and software license optimization program 32 according to an embodiment of the present invention. Moreover, computer 10 includes asset management database 201 and software contracts database 203. Computer 10 is coupled to I/0 devices 26 through I/0 interface 24. I/0 interface 24 includes any system for exchanging information to or from an external device. I/0 devices 26 include any known type of external device such as a display device (e.g., monitor), keyboard, mouse, printer, speakers, handheld device, facsimile, microphone, or webcam.

In addition, software contracts database 203 stores software licensing data. Software licensing data include information regarding what software programs are allowed to be installed on computer hardware systems (hardware systems) 50, and permitted types of installations of the software program based on terms and conditions of software licenses that have been purchased. Moreover, software licensing data can include information such as how to count software licenses (e.g., count software licenses per end-user or per processor), the amount of software licenses that have been purchased, which of hardware systems 50 the software programs are allowed to be installed on (e.g., production servers only or development servers only), whether a software license is needed for a disaster recovery hardware system, and which one of the software programs determines the software license counts if the software programs are part of a bundle.

Furthermore, computer 10 is connected to hardware systems 50 through TCP/IP adapter card 22 and IP network 40 such as the Internet. Hardware systems 50 are electronic devices that include desktops, laptops, mainframes, and servers, wherein endpoint scanner 55 is installed on each of the hardware systems. Endpoint scanner 55 measures software and hardware usage data and inventory data pertaining to the hardware systems 50 in which it is installed, and sends this information to program 32 within computer 10. Program 32 assigns a dynamic configurable usage state value for each of the software programs installed on the hardware systems. The usage state value assigned for each of the software programs indicates whether or not they are underutilized (based on usage limits set forth in the applicable software license), and is used to determine an option for possible decommission or consolidation of the software programs. The software and hardware usage data, and inventory data are stored in asset management database 201. The software and hardware usage data include the amount of processor resources, memory, hard disk space, and network resources that are consumed on hardware systems 50 in aggregate of all software programs installed on the hardware systems, and on a per software program installed basis. The inventory data includes information about which software programs are installed on hardware systems 50. Furthermore, hardware profile database 53 provides hardware profile information about hardware systems 50 to program 32, wherein the hardware profile information includes the amount of processors, cores per processor, environment where the hardware systems reside, and make/model of the hardware systems. The hardware profile information is used by program 32 to calculate the percentage of processors, memory, hard disk space, and/or the network resources being utilized by software programs installed on hardware systems 50.

Reconciliation program engine 30 provides reconciliation information and can generate reconciliation report 205. Specifically, reconciliation program engine 30 compares the inventory data with the software licensing data, and provides reconciliation information that indicates what software programs are compliant and what software programs are not compliant with corresponding software licenses that have been purchased.

As described in more detail below program 32 generates software license cost savings report 207. Software license cost savings report 207 identifies a software program installed on hardware systems 50, and determines potential software license cost savings associated with an option for possible decommission or consolidation of the software program. Specifically, program 32 utilizes the software and hardware usage data and inventory data from asset management database 201, and the reconciliation information from reconciliation program engine 30 to generate software license cost savings report 207. Software license cost savings report 207 can include the following information: a listing of each software program installed on hardware systems 50, a recommendation providing an option for decommission or an option for consolidation for each software program installed, a candidate hardware system for the option for consolidation that is included in the recommendation, and potential software license cost savings associated with the option for decommission or the option for consolidation.

Figure 2A:
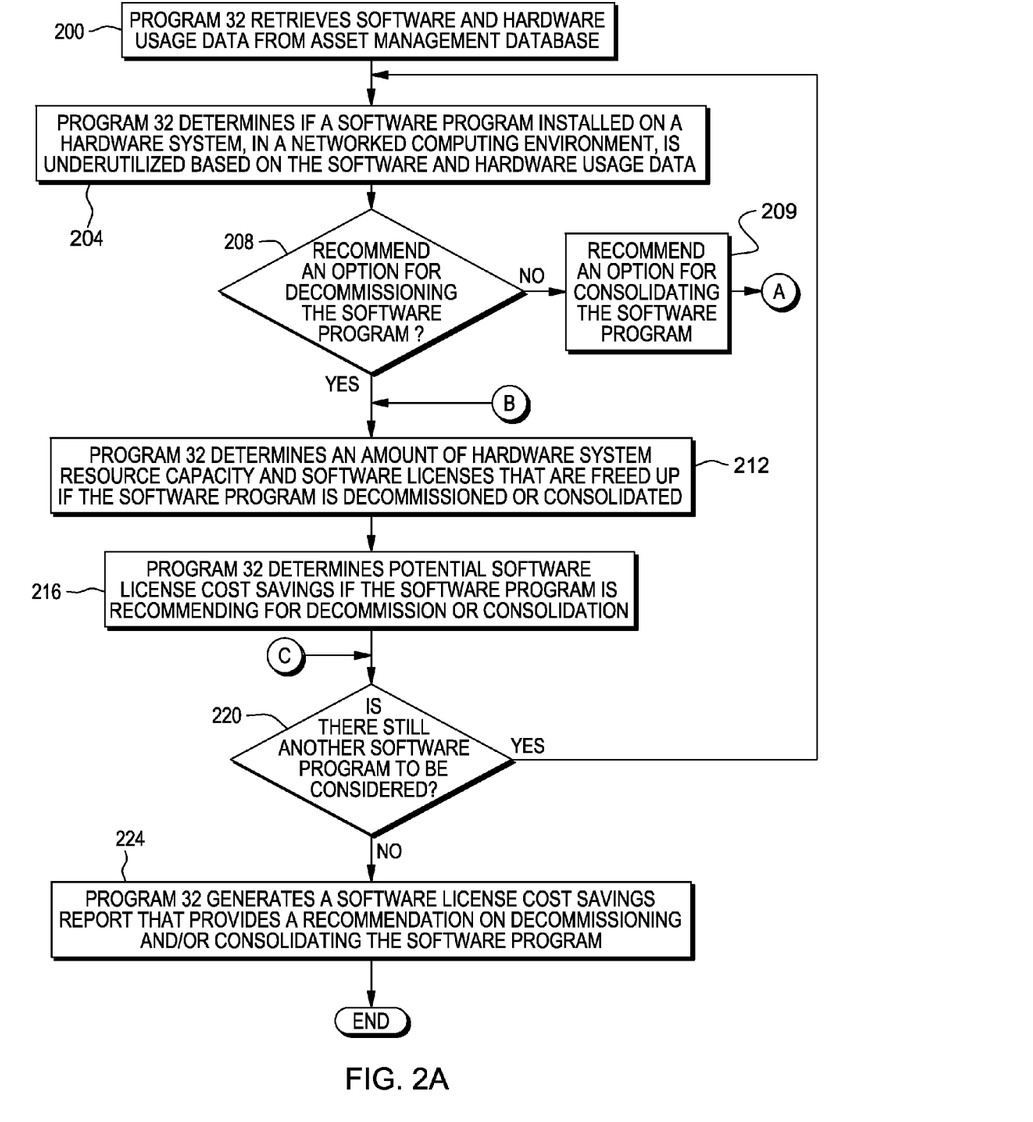
FIGS. 2A-2C are flowcharts of the software license optimization program according to an embodiment of the present invention.
Figure 2B:
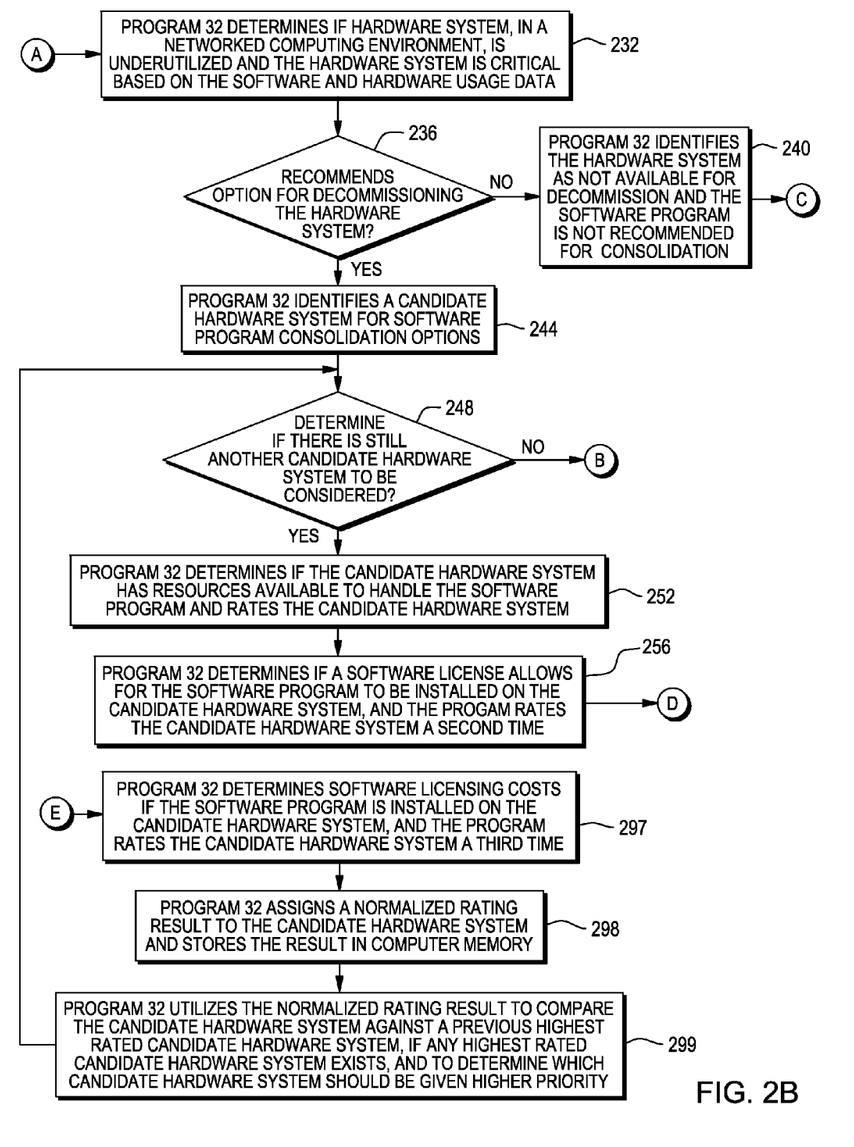
Figure 2C:
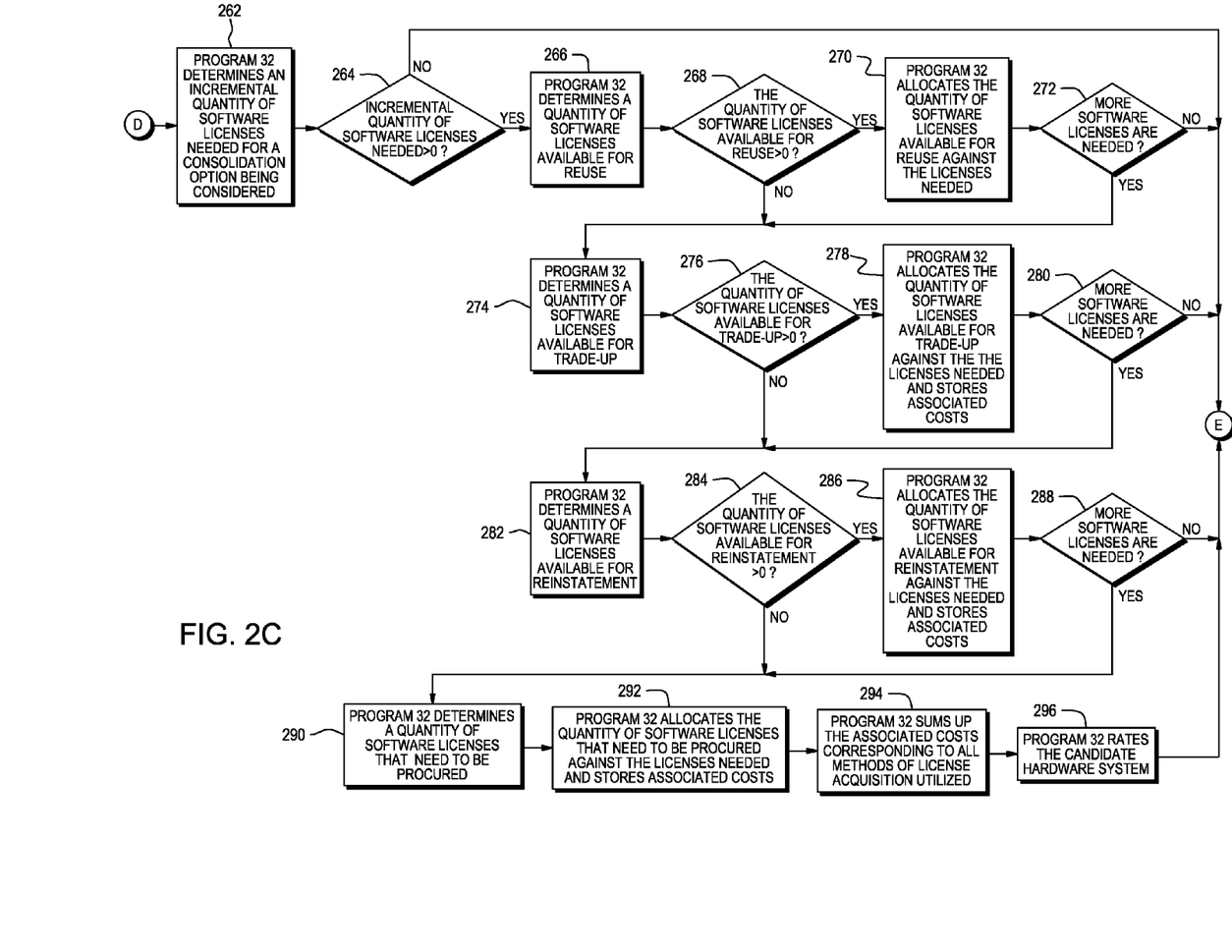

FIGS. 2A-2C are flowcharts illustrating key steps of program 32. Software license optimization program 32 retrieves software and hardware usage data from asset management database 201 (step 200). Specifically, program 32 retrieves the software and hardware usage data by utilizing inventory data that is also stored in asset management database 201, to perform a database query operation. Inventory data include information about which software programs are installed on hardware systems 50, and the database query operation results in the software and hardware usage data being provided to program 32. The software and hardware usage data include information about processor resources, memory, hard disk space, and network resources that are consumed on hardware systems 50. Specifically, software usage data is defined as being data that represents the amount of processor, memory, hard disk space, and network resources consumed by a single software program installed on one of hardware systems 50. The software usage data includes a value called software usage that quantitatively represents the amount of processor, memory, hard disk space, and network resources consumed by a single software program installed on one of hardware systems 50. The software usage data may be different for each of hardware systems 50 on which the single software program is installed. Moreover, hardware usage data is defined as being data that represents the amount of processor, memory, hard disk space, and network resources consumed by all software programs installed on hardware systems 50. The hardware usage data includes a value called hardware usage that quantitatively represents the sum of all software usage for all software programs installed on hardware system 50. The hardware usage data may be different for each of hardware systems 50 on which the software programs are installed.

In the present embodiment described in detail below, there are two or more software programs, first software program 51 and second software program 52, installed on one or more of hardware systems 50 (along with endpoint scanner 55 and other support programs). However, in other embodiments of the present invention there may be fewer or more software programs (for which a software license is being optimized) installed on one or more hardware systems 50 (along with endpoint scanner 55 and other support programs). Thus, in the present embodiment, program 32 determines if first software program 51 installed on one or more of hardware systems 50 is underutilized based on the software and hardware usage data retrieved from asset management database 201 (step 204). Specifically, to determine whether first software program 51 is underutilized program 32 first parses the software and hardware usage data that are provided in query results from asset management database 201. After parsing the software and hardware usage data, program 32 determines the usage state value assigned to first software program 51 by mapping the software and hardware usage data to user-defined thresholds which are provided at program runtime. The user-defined thresholds indicate amounts of utilization that an end-user considers to be sufficient to warrant the cost of forecasted annual software licensing fees. For example, a user-defined threshold can be a value that represents the percentage of processing power used by a software program on a per daily, per weekly, per monthly, or per yearly basis. Thus, the user-defined threshold can be set to accommodate a software program that is critical but runs less frequently, such as on a per yearly basis. The user-defined thresholds provided at program runtime can be changed to accommodate different business scenarios or requirements. The usage state value assigned to first software program 51 is used by program 32 to determine whether the first software program is underutilized. In one embodiment, the usage state value can include 'normal utilization', 'not running', 'minimal resource', 'no connections', or 'cascade no use'. Thus, program 32 takes the user-defined thresholds, provided at program runtime, and maps software and hardware usage data of first software program 51 to one of the user-defined thresholds in order to assign the usage state value to the first software program.

The usage state value of 'normal utilization' indicates a software program is found present on a hardware system 50, and is running. The 'normal utilization' usage state value would be assigned to a software program when its processor usage percentage and memory usage percentage are above a user-defined threshold, and its hard disk consumption is greater than 0%. Thus, the software program will be deemed not underutilized, and would indicate to program 32 that the software program is not eligible for decommission, but may still be eligible for consolidation.

The usage state value of 'not running' indicates a software program is found present on a hardware system 50, but not currently running. The 'not running' usage state value would be assigned to a software program when its processor usage percentage and memory usage percentage are both 0%, but its hard disk consumption is greater than 0%. Thus, the software program will be deemed underutilized, and would indicate to program 32 that the software program is eligible for decommission.

The usage state value of 'minimal resource' indicates that a software program is found to have a processor usage percentage and a memory usage percentage below the lowest user-defined threshold. Specifically, if the software program has a usage state value of "minimal resource", then this indicates that program 32 found the software program to be installed and running on a hardware system 50 having a processor usage percentage and memory usage percentage that are below the lowest user-defined threshold. As a result, the software program will be deemed underutilized, and would indicate to program 32 that the software program is eligible for decommission.

The usage state value of 'no connections' indicates that a software program is found to have a processor usage percentage and a memory usage percentage above a user-defined threshold. Hence, the software program is consuming a sufficient amount of resources to be deemed running and not underutilized. However, the usage state value of "no connections" also indicates the software program may be running but without any end-users or other applications establishing a network connection with the software program. Thus, if the software program is a service or server-related application in a client-server model, then having a usage state value of "no connections" corresponds to having "no clients", and would indicate to program 32 that the software program is eligible for decommission.

In addition, the usage state value of 'cascade no use' indicates that a software program is found to have a processor usage percentage and a memory usage percentage above the lowest user-defined threshold. However, the software program having an assigned usage state value of 'cascade no use' will also indicate to program 32 that the software program is eligible for decommission even though the software program is consuming a sufficient amount of resources to be deemed running, and even though network resource information from endpoint scanner 55 shows another software application is communicating with the software program. For example, if another software application that is eligible for decommission is the only software application communicating with the software program, then program 32 can assign a usage state value of "cascade no use" to the software program. Thus, in the present embodiment, the usage state value can include 'normal utilization', 'not running', 'minimal resource', 'no connections', or 'cascade no use'.

Accordingly, utilizing the usage state value assigned to first software program 51, program 32 can determine that the first software program is underutilized and recommend decommissioning the first software program (decision 208, yes branch), or determine that the first software program is not underutilized and recommend the first software program for possible consolidation (decision 208, no branch).

In the present embodiment, program 32 determines that first software program 51 is underutilized, and recommends an option for decommissioning the first software program (decision 208, yes branch). As result program 32 determines an amount of hardware system resource capacity and software licenses that are freed up if first software program 51 is decommissioned (step 212). To determine the amount of hardware system resource capacity that is freed up if first software program 51 is decommissioned program 32 performs a hardware system resource operation utilizing the software and hardware usage data, and the hardware profile information.

In the present embodiment, the hardware system resource operation involves calculating the percentage of hardware system resource capacity freed up and made available if first software program 51 is decommissioned, and the percentage of used resource capacity freed up and made available. Specifically, the percentage of hardware system resource capacity freed up can be calculated by dividing the software usage of first software program 51 by a hardware system resource value representing the amount of total memory and CPU on a hardware system 50, wherein the hardware system resource value is in the hardware profile data. In addition, the percentage of used resource capacity freed up can be calculated by dividing the software usage of first software program 51 by hardware usage, wherein the hardware usage represents the sum of all software usage for all software programs installed on a hardware system 50. After performing the hardware system resource operation, program 32 provides the amount of hardware system resource capacity freed up (i.e., made available) if first software program 51 were to be decommissioned, wherein the amount will be included in software license cost savings report 207 that is subsequently generated by the program 32.

In addition, to determine the amount of software licenses freed up (i.e., made available) program 32 performs a software license capacity operation utilizing software licensing data from software contracts database 203, and hardware profile information data from hardware profile database 53. In the preferred embodiment, the software license capacity operation involves looking up the licensing model being utilized for the software program installed and determining how much software license capacity would be freed up, if any, by a possible decommission or consolidation of the software program. Information about what licensing model is being utilized is provided in the software licensing data. For example, certain licensing models such as 'site licenses' may result in no licenses being freed up. In addition, certain licenses such as a "number of copies" license would result in a direct freeing up of a license. There are various licensing models that can be created and employed, such as a "user-based" license that may require utilizing the software and hardware usage data to determine how much software license capacity could be freed up, but program 32 is configurable to handle all such licensing models.

Thus, the software license capacity operation, of program 32, can compute the amount of software licenses that would be freed up if first software program 51 was to be decommissioned, wherein the computation is subsequently utilized by the program 32 to determine potential software license cost savings (step 216), if there are any cost savings to be found. Therefore, depending on the software licensing model, it is possible that decommissioning first software program 51 will result in no software license cost savings. For example, if first software program 51 has an unlimited copies license, or a site-based license, there will be no cost savings by decommissioning.

Accordingly, in the present embodiment, program 32 uses the software license capacity operation to estimate potential software license cost savings resulting from possible decommissioning. If no software license cost savings would result from decommissioning first software program 51, then software license cost savings report 207 that is subsequently generated would show a zero dollar cost savings, and not show a recommendation for decommissioning the first software program. However, if a software license cost savings would result from decommissioning first software program 51, then software license cost savings report 207 that is subsequently generated would show an amount of cost savings and show a recommendation for decommissioning the first software program.

After determining software license cost savings, if program 32 determines that there is not another software program to be considered (decision 220, no branch) then the program 32 will generate software license cost savings report 207 (step 224), wherein the software license cost savings report provides a recommendation for possible decommission of first software program 51. The software license cost savings report 207 can include the following information: whether or not a software program is eligible for decommission or consolidation, a source hardware system and target hardware system if the software program is recommended for consolidation, potential software license cost savings of decommission or consolidation of the software program, a recommendation for decommission (yes/no), and a recommendation for consolidation (yes/no). After generating software license cost savings report 207, the operations of program 32 end.

However, in the present embodiment, second software program 52 is installed on hardware systems 50. As a result, program 32 determines that there is still another software program to be considered for decommission or consolidation and postpones generating software license cost savings report 207 (decision 220, yes branch), and instead the program 32 determines if second software program 52 is underutilized (step 204) based on a usage state value previously assigned to the second software program by the program 32.

Utilizing the usage state value assigned to second software program 52, program 32 can determine that the second software program is underutilized and recommend decommissioning the second software program (decision 208, yes branch), or determine that the second software program is not underutilized or is listed in the program 32 as critical and not recommend decommissioning the second software program (decision 208, no branch) but instead recommend an option for consolidating the second software program (step 209) if such an option exists. In the present embodiment, program 32 determines that second software program 52 is not underutilized, so does not recommend decommissioning the second software program (decision 208, no branch). Thus, program 32 recommends an option for consolidating second software program 52, if any such option for consolidation exists (step 209). Consolidation of a software program can also provide software license cost savings.

To provide an option for consolidation of second software program 52, program 32 determines if any part of hardware systems 50 on which the second software program is installed is underutilized, and if the hardware system or the second software program are listed in the program 32 as critical (step 232). Hardware systems 50 listed as critical are important to an organization and cannot be decommissioned. In addition, a software program listed as critical may be a software program that is underutilized, but it so important to an organization that it cannot be decommissioned or consolidated. Thus, a configurable list of hardware systems 50 and software programs that are critical to an organization can be included a file or database referenced by in program 32, and different levels of importance related to how critical the software programs are can be assigned and associated to each of the software programs. For example, if there is one copy of a software program that is available to an entire organization, and another copy of the same software program that is available only to a subset of the organization, then the one copy will likely be more critical to the organization. Thus, if program 32 determines that either of two copies of a software program is not needed, based on low utilization of either one or both of these software programs, then program 32 optionally identifies the software program with a lower level of importance (i.e., criticality as determined by a file or database referenced by program 32) to uninstall or reallocate another one of hardware systems 50 having the software program installed. Absent an end-user entry of the importance of each copy of a software program, program 32 can automatically determine the importance of each copy of a software program based on the following factors: existence of software program availability monitoring, existence of automated backups of the software program and/or associated data, business applications that run on the software program, and environment of the software program (e.g., production, development, or test).

To determine if any part of hardware systems 50 having second software program 52 installed is underutilized, program 32 performs a hardware systems utilization operation, wherein the program 32 uses information from the software and hardware usage data stored on asset management database 201. The information, from the software and hardware usage data, utilized by program 32 to perform the hardware system utilization operation includes processor utilization, memory utilization, and hard disk consumption values. In the present embodiment, the hardware systems utilization operation involves comparing the processor utilization, memory utilization, and hard disk consumption values to user-defined threshold values that are provided at runtime. These threshold values are provided at runtime and are user-defined to allow for differing requirements and scenario analysis.

After performing the hardware systems utilization operation, a dynamic configurable hardware system utilization rating is assigned to each of hardware systems 50 by program 32. If the hardware system utilization ratings of hardware systems 50 having second software program 52 installed are above a configurable threshold amount, or the hardware systems are on the configurable list of hardware systems 50 and software programs that are critical to an organization then the program 32 does not recommend decommissioning the hardware systems (decision 236, no branch). Instead, program 32 identifies hardware systems 50 having second software program 52 installed as not available for decommission, and as a result the second software program is not recommended for consolidation (step 240). Subsequently, if there is a third software program to be considered (decision 220, yes branch), then program 32 will iterate to the third software program and determine if the third software program installed on one or more of hardware systems 50, in the networked computing environment, is underutilized based on the software and hardware usage data retrieved from asset management database 201 (step 204). Specifically, to determine whether the third software program is underutilized program 32 parses the software and hardware usage data, that is returned from asset management database 201, to obtain the usage state value previously assigned by the program to the third software program. Program 32 will continue to run until all software programs installed on hardware systems 50 or all software programs specified by an end-user have been considered for possible decommission or consolidation.

However, in the present embodiment, a third software program is not installed on hardware systems 50, the hardware system utilization rating of hardware systems 50 having second software program 52 installed is below a configurable threshold amount, and the hardware systems are not on the configurable list of hardware systems and software programs that are critical to an organization. As a result, program 32 recommends options for decommissioning the hardware systems (decision 236, yes branch). Specifically, program 32 identifies a candidate hardware system, from hardware systems 50, for software program consolidation options (step 244) related to consolidating second software program 52. A software program consolidation operation is executed to identify the candidate hardware system. To execute the software program consolidation operation program 32 uses inventory data and software licensing data, and performs comparisons utilizing a list of factors that includes the following: an assignable value associated with future need to install a software program, an assignable value associated with potential software license cost savings from performing a consolidation, an assignable value associated with confidence level of consumption percentage calculation (i.e., consumption percentage=[total consumed software licenses]/[total purchased software licenses]) in scenarios where the software program is part of a software bundle and precision of the calculation is uncertain, an assignable level of importance (i.e., criticality) associated with how critical the software program is if the software program is listed as critical, and an assignable value associated with whether the consolidation will not provide software license cost savings (e.g., consolidation involving a disaster recovery license requiring no license fee). Program 32 determines the future need for copies of a software program by evaluating the following information: contractual information that describes future payments necessary for the software program, architectural information that describes planned expansion/contraction for the software program, request for services queue that describes current demand for additional copies of the software program, and vendor information on life cycle of the software program (e.g., has the vendor declared that the software program will be removed from marketing). Moreover, in the preferred embodiment, the software program consolidation operation involves identifying a hardware system 50 for possible decommission, a listing of all software programs found on the hardware system identified, a listing of all candidate hardware systems with their hardware system utilization ratings, and determining the candidate hardware system that is preferred for consolidation of the software programs.

In the present embodiment, after performing the software program consolidation operation, program 32 identifies that there is a candidate hardware system available for consolidating second software program 52 (decision 248, yes branch). As a result, program 32 determines if the candidate hardware system has enough resources (i.e., memory, CPU, hard disk space) available to handle second software program 52 and rates the candidate hardware system (step 252).

Specifically, in order to determine whether the candidate hardware system has enough resources (i.e., memory, CPU, hard disk space) available to handle second software program 52, program 32 must determine the maximum resources (i.e., memory, CPU, hard disk space) available on the candidate hardware system by: looking up the candidate hardware system resource (i.e., memory, CPU, hard disk space) capacities in the hardware profile database 53, multiplying the candidate hardware system resource (i.e., memory, CPU, hard disk) capacities by a user-defined maximum capacity percentage value to ensure the candidate hardware system resource capacity is not 100% consumed, and subtracting out the sum of all the current software program usage on the candidate hardware system to obtain an amount of available hardware system resource capacity. Current software program usage is a value that represents the amount of processor, memory, hard disk space, and network resources currently consumed by a single software program on the candidate hardware system. For example, if the total memory on the candidate hardware system is 4 GB, program 32 is configured to apply a maximum capacity percentage value of 80%, and the sum of all software program usage from the hardware usage data is 2 GB, then program 32 would calculate the available hardware system resource capacity to be 1.2 GB (i.e., [4 GB×0.80]−2 GB=1.2 GB).

Moreover, program 32 rates the candidate hardware system with an assigned score by taking the available hardware system resource capacity on the candidate hardware system and subtracting out the amount of available hardware system resource capacity that second software program 52 is estimated to consume, in order to determine what the new available hardware system resource capacity would be. For example, if a candidate hardware system has an available hardware system resource capacity of 1.2 GB, and the new software program that is being considered for consolidation is estimated to consume 0.5 GB, then the new available hardware system resource capacity would be 0.7 GB or 700 MB (1.2 GB−0.5 GB=0.7 GB). In the preferred embodiment, a score is assigned to the candidate hardware system by program 32. The higher the new available hardware system resource capacity, the higher the score assigned to the candidate hardware system. Thus, a high score may be assigned to the candidate hardware system if it has a large amount of hardware system resources (e.g., large amount of memory capacity, CPU capacity, hard disk space capacity) available to handle second software program 52. Conversely, a low score may be assigned to the candidate hardware system if it has a small amount of hardware system resources (e.g., small amount of memory capacity, CPU capacity, hard disk space capacity) available to handle second software program 52. The possible range of scores would be user-defined and configurable to allow for changing requirements and scenario analysis.

Next, program 32 determines if a software license allows for second software program 52 to be installed on the candidate hardware system (i.e., software license capacity), by performing a software license consumption operation that utilizes software licensing data from software contracts database 203, and the program 32 rates the candidate hardware system a second time (step 256). The software licensing data include information regarding what software programs are allowed to be installed on hardware systems 50, based on terms and conditions of software licenses that have been purchased.

To perform the software license consumption operation program 32 determines an incremental quantity of software licenses needed (step 262) for a consolidation option that is being considered. If the incremental quantity of software licenses needed is less than or equal to zero (decision 264, no branch), then the license consumption operation ends. Otherwise, if the incremental quantity of software licenses needed is greater than zero (decision 264, yes branch), then program 32 determines a quantity of software licenses available for reuse (step 266). No additional licensing fees are required for software licenses that are available for reuse. Subsequently, if program 32 determines the quantity of software licenses available for reuse is greater than zero (decision 268, yes branch), then the program allocates the quantity of software licenses available for reuse against the licenses needed (step 270). Next, if program 32 determines that no more software licenses are needed for the consolidation option being considered (decision 272, no branch), then the license consumption operation ends.

However, if program 32 determines that the quantity of software licenses available for reuse is less than or equal to zero (decision 268, no branch) or that more software licenses are needed (decision 272, yes branch), then the program determines a quantity of software licenses available for trade-up (step 274). Subsequently, if program 32 determines the quantity of software licenses available for trade-up is greater than zero (decision 276, yes branch), then the program allocates the quantity of software licenses available for trade-up against the licenses needed and stores associated costs (step 278). Next, if program 32 determines that no more software licenses are needed for the consolidation option being considered (decision 280, no branch), then the license consumption operation ends.

However, if program 32 determines that the quantity of software licenses available for trade-up is less than or equal to zero (decision 276, no branch) or that more software licenses are needed (decision 280, yes branch), then the program determines a quantity of software licenses available for reinstatement (step 282). Subsequently, if program 32 determines the quantity of software licenses available for reinstatement is greater than zero (decision 284, yes branch), then the program allocates the quantity of software licenses available for reinstatement against the licenses needed and stores associated costs (step 286). Next, if program 32 determines that no more software licenses are needed for the consolidation option being considered (decision 288, no branch), then the license consumption operation ends.

However, if program 32 determines that the quantity of software licenses available for reinstatement is less than or equal to zero (decision 284, no branch) or that more software licenses are needed (decision 288, yes branch), then the program determines a quantity of software licenses that need to be procured (step 290). Subsequently, program 32 allocates the quantity of software licenses need to be procured against the licenses needed and stores associated costs (step 292). Program 32 sums up the associated costs corresponding to all methods of license acquisition utilized (step 294), and then the program rates the candidate hardware system by assigning a score to the candidate hardware system (step 296). Thus, a higher score may be assigned to the candidate hardware system by program 32 if the program determines that second software program 52 can be installed on the candidate hardware system with minimal associated costs corresponding to the methods of license acquisition utilized. Conversely, a lower score is assigned to the candidate hardware system by program 32 if the program determines that second software program 52 can be installed on the candidate hardware system but with high associated costs corresponding to the methods of license acquisition utilized. The possible range of scores would be user-defined and configurable to allow for changing requirements and scenario analysis.

Program 32 then determines software licensing costs if second software program 52 is installed on the candidate hardware system, and the program 32 rates the candidate hardware system a third time (step 297). Specifically, in the present embodiment, program 32 determines the software licensing cost by calculating the present value of future software licensing costs expected over a given period of time (e.g., a five-year period) based on the licensing model being utilized for second software program 52. For example, if the licensing model is based on "number of copies" then program 32 computes the software licensing cost by multiplying the number of decommissioned software programs having this licensing model by the software licensing cost found in the software licensing data, and then calculates the present value of the software licensing cost. Alternatively, if the licensing model is "user-based" then program 32 computes the software licensing cost by multiplying the number of end-users found to be utilizing this software program by the "cost per end-user" in the software licensing data, and then calculates the present value of the software licensing cost. There are various other licensing models that can be utilized for second software program 52, but program 32 is configurable to handle all such licensing models in order to determine the software licensing cost. Thus, in the present embodiment, program 32 can determine the software licensing cost of having second software program 52 installed on the candidate hardware system.

Based on the software licensing cost that is computed, program 32 rates the candidate hardware system a third time. In the preferred embodiment, a score is assigned to the candidate hardware system. For example, a high score may be assigned to the candidate hardware system if the software licensing cost, computed by program 32, is low. Conversely, a low score may be assigned to the candidate hardware system if the software licensing cost, computed by program 32, is high.

Subsequently, program 32 assigns a normalized rating result to the candidate hardware system based on each of the previous three ratings, wherein the program utilizes a user-defined configurable normalization scale to compute the normalized rating result, and wherein the program stores the normalized rating result in computer memory (e.g., RAM 16) (step 298). The normalization scale includes three weighted percentage values corresponding with software license cost, hardware resource capacity, and software license capacity that sum up to 100%. For example, the scale may include a weighted percentage value of 50% corresponding to software license cost, a weighted percentage value of 30% corresponding to hardware resource capacity, and a weighted percentage value of 20% corresponding to software license capacity. The resulting normalized rating would then be calculated by multiplying the software license cost, hardware system resource capacity, and software license capacity by their corresponding weighted percentage values and summing up those values to compute the normalized rating (e.g., [software license cost×0.50]+[hardware resource capacity×0.30]+[software license capacity×0.20]=normalized rating). Next, program 32 utilizes the normalized rating result to compare the candidate hardware system against a previous highest rated candidate hardware system, if any highest rated candidate hardware system exists, and to determine which candidate hardware system should be given higher priority (step 299). However, in the present embodiment, since there is no previous highest rated candidate hardware system that exists the current candidate hardware system is automatically assigned the highest priority.

After program 32 performs the comparison and the candidate hardware system is assigned the highest priority, the program then determines if there is still another candidate hardware system to be considered (decision 248). If there is still another candidate hardware system to be considered, program 32 will continue to execute until all candidate hardware systems have been considered.

However, in the present embodiment, there is no other candidate hardware system to be considered (decision 248, no branch), so program 32 determines an amount of hardware system resources and software licenses that are freed up (i.e., made available) if first software program 51 is decommissioned, and second software program 52 is consolidated (step 212). Moreover, software license cost savings are determined based on first software program 51 being decommissioned and second software program 52 being consolidated (step 216). If program 32 determines that there is still another software program to be considered (decision 220, yes branch) then program will continue. However, in the present embodiment, program 32 determines there are no other software programs to be considered (decision 220, no branch). As a result, program 32 generates software license cost savings report 207 (step 224) that provides an option for decommissioning first software program 51 and an option consolidating second software program 52, and identifies potential software license cost savings associated with the options.

In the present embodiment, only two software programs (i.e., first software program 51 and second software program 52) were considered for possible decommission or consolidation, and only one candidate hardware system was considered for consolidation. However, in other embodiments there may be only one software program, more than two software programs, or no software programs to be considered for possible decommission or consolidation. Moreover, there may be more than one candidate hardware system or no candidate hardware system to be considered for possible software consolidation. Thus, there are many decommission and consolidation scenarios, based on the number of software programs and hardware systems 50 that exist in the networked computing environment, and program 32 is capable of handling all such scenarios.

Based on the foregoing, a computer system, method, and program product for determining options for decommissioning or consolidating a software program and to reduce software license fees and satisfy other customer needs in the short and long term, have been disclosed. However, numerous modifications and substitutions can be made without deviating from the scope of the present invention. In this regard, each block in the flowchart or block diagrams may represent a module, segment, or portion of code, which includes one or more executable instructions for implementing the specified logical functions(s). It should be noted that, in some alternative implementations, the functions noted in the block may occur out of the order noted in the figures. Therefore, the present invention has been disclosed by way of example and not limitation.

What is claimed is:

1. A method for managing a software program installed on a first computer, the software program being subject to a software license indicating a permitted number of installations of copies of the software program and permitted amounts of processor power of computers in which the copies of the software program are installed, the method comprising the steps of:

retrieving, by one or more processors, (a) data indicating actual usage of the software program on the first computer, (b) data indicating processor power of the first computer, and (c) licensing data from the software license indicating the permitted number of installations of copies of the software program and the permitted amounts of processor power of computers in which copies of the software program are installed; and determining and reporting, by the one or more processors, that the software program should be removed from the first computer and one of (a) installed on a second computer which does not currently have a copy of the software program installed or (b) workload of the software program from the first computer transferred to a third copy of the software program currently installed on a third computer based on:

the actual usage of the software program on the first computer, a projected amount of future usage requirements for the software program, compliance with the license as to the permitted number of installations of copies of the software program and the permitted amounts of processor power of computers in which copies of the software program are installed, and a projected future need for one or more additional, future installations of copies of the software program on one or more additional respective computers with requisite processor power to satisfy the projected future usage requirements and a corresponding need to have fewer than the permitted number of installations of copies of the software program under the license before the projected future need to allow these additional, future installations of copies of the software program without exceeding the permitted number of installations of copies of the software program under the license.

2. The method of claim 1, wherein:

the licensing data is stored on a first database in which the first database is a software contracts database;

the data indicating actual usage and inventory data are stored on a second database in which the second database is an asset management database;

the inventory data is utilized for listing each software program installed on the first computer;

the data indicating actual usage and the inventory data are provided by an endpoint scanner installed on the first computer;

the data indicating actual usage comprises a dynamic configurable usage state value that is assigned to the software program; and the data indicating actual usage further comprises an amount of processor resources, memory, hard disk space, and network resources that are consumed on the first computer.

3. The method of claim 2, wherein:
the first database is utilized to determine freed software license capacity and software license cost savings; and
the dynamic configurable usage state value assigned to the software program indicates utilization of the software program on the first computer.

4. The method of claim 1, wherein the step of determining and reporting, by the one or more processors, comprises:
generating a listing of each software program installed on the first computer;
indicating whether to decommission or consolidate the software program; and
indicating a potential software license cost savings.

5. A computer program product for managing a software program installed on a first computer, the software program being subject to a software license indicating a permitted number of installations of copies of the software program and permitted amounts of processor power of computers in which the copies of the software program are installed, the computer program product comprising:
a computer-readable storage device and program instructions stored on the computer-readable storage device, the program instructions include:
program instructions to retrieve (a) data indicating actual usage of the software program on the first computer, (b) data indicating processor power of the first computer, and (c) licensing data from the software license indicating the permitted number of installations of copies of the software program and the permitted amounts of processor power of computers in which copies of the software program are installed; and
program instructions to determine and report that the software program should be removed from the first computer and one of (a) installed on a second computer which does not currently have a copy of the software program installed or (b) workload of the software program from the first computer transferred to a third copy of the software program currently installed on a third computer based on:
the actual usage of the software program on the first computer,
a projected amount of future usage requirements for the software program,
compliance with the license as to the permitted number of installations of copies of the software program and the permitted amounts of processor power of computers in which copies of the software program are installed, and
a projected future need for one or more additional, future installations of copies of the software program on one or more additional respective computers with requisite processor power to satisfy the projected future usage requirements and a corresponding need to have fewer than the permitted number of installations of copies of the software program under the license before the projected future need to allow these additional, future installations of copies of the software program without exceeding the permitted number of installations of copies of the software program under the license.

6. The computer program product of claim 5, wherein:
the licensing data is stored on a first database in which the first database is a software contracts database;
the data indicating actual usage and inventory data are stored on a second database in which the second database is an asset management database;
the inventory data is utilized for listing each software program installed on the first computer;
the data indicating actual usage and the inventory data are provided by an endpoint scanner installed on the first computer;
the data indicating actual usage comprises a dynamic configurable usage state value that is assigned to the software program; and
the data indicating actual usage further comprises an amount of processor resources, memory, hard disk space, and network resources that are consumed on the first computer.

7. The computer program product of claim 6, wherein:
the first database is utilized to determine freed software license capacity and software license cost savings; and
the dynamic configurable usage state value assigned to the software program indicates utilization of the software program on the first computer.

8. The computer program product of claim 5, wherein the step of determining and reporting comprises:
generating a listing of each software program installed on the first computer;
indicating whether to decommission or consolidate the software program; and
indicating a potential software license cost savings.

9. A method for managing a software program installed on a first computer, the software program being subject to a software license indicating a permitted number of installations of the software program and permitted amounts of processor power of computers in which copies of the software program are installed, the method comprising the steps of:
retrieving, by one or more processors, (a) data indicating actual usage of the software program on the first computer, (b) data indicating processor power of the first computer, and (c) licensing data from the software license indicating the permitted number of installations of the software program and the permitted amount of processor power of the computers in which copies of the software program are installed; and
determining and reporting, by the one or more processors, that the software program should be removed from the first computer and the first computer should be decommissioned based on (i) the actual usage of the software program on the first computer, (ii) the licensing data, (iii) compliance with the license as to the permitted number of installations of the software program and the permitted amounts of processor power of computers in which copies of the software program are installed, and (iv) data indicating the first computer is underutilized.

10. The method of claim 9, wherein:
the licensing data is stored on a first database in which the first database is a software contracts database;
the data indicating actual usage and inventory data are stored on a second database in which the second database is an asset management database;
the inventory data is utilized for listing each software program installed on the first computer;
the data indicating actual usage and the inventory data are provided by an endpoint scanner installed on the first computer;
the data indicating actual usage comprises a dynamic configurable usage state value that is assigned to the software program; and the data indicating actual usage further comprises an amount of processor resources, memory, hard disk space, and network resources that are consumed on the first computer.

11. The method of claim 10, wherein:

the first database is utilized to determine freed software license capacity and software license cost savings; and the dynamic configurable usage state value assigned to the software program indicates utilization of the software program on the first computer.

12. The method of claim 9, wherein the step of determining and reporting, by the one or more processors, comprises:

assigning a level of importance for the software program based on the following factors:

existence of software program availability monitoring, existence of automated backups of the software program and/or associated data, business applications that run on the software program, and environment of the software program;

generating a listing of each software program installed on the first computer;

indicating whether to decommission or consolidate the software program; and indicating a potential software license cost savings.

13. A computer program product for managing a software program installed on a first computer, the software program being subject to a software license indicating a permitted number of installations of the software program and permitted amounts of processor power of computers in which copies of the software program are installed, the computer program product comprising:

a computer-readable storage device and program instructions stored on the computer-readable storage device, the program instructions include:

program instructions to retrieve (a) data indicating actual usage of the software program on the first computer, (b) data indicating processor power of the first computer, and (c) licensing data from the software license indicating the permitted number of installations of the software program and the permitted amount of processor power of computers in which copies of the software program are installed; and program instructions to determine and report that the software program should be removed from the first computer and the first computer should be decommissioned based on (i) the actual usage of the software program on the first computer, (ii) the licensing data, (iii) compliance with the license as to the permitted number of installations of the software program and the permitted amounts of processor power of computers in which copies of the software program are installed, and (iv) data indicating the first computer is underutilized.

14. The computer program product of claim 13, wherein:

the licensing data is stored on a first database in which the first database is a software contracts database;

the data indicating actual usage and inventory data are stored on a second database in which the second database is an asset management database;

the inventory data is utilized for listing each software program installed on the first computer;

the data indicating actual usage and the inventory data are provided by an endpoint scanner installed on the first computer;

the data indicating actual usage comprises a dynamic configurable usage state value that is assigned to the software program; and the data indicating actual usage further comprises an amount of processor resources, memory, hard disk space, and network resources that are consumed on the first computer.

15. The computer program product of claim 14, wherein:

the first database is utilized to determine freed software license capacity and software license cost savings; and the dynamic configurable usage state value assigned to the software program indicates utilization of the software program on the first computer.

16. The computer program product of claim 13, wherein the step of determining and reporting comprises:

assigning a level of importance for the software program based on the following factors:

existence of software program availability monitoring, existence of automated backups of the software program and/or associated data, business applications that run on the software program, and environment of the software program;

generating a listing of each software program installed on the first computer;

indicating whether to decommission or consolidate the software program; and indicating a potential software license cost savings.

* * * * *